(12) United States Patent  (10) Patent No.: US 9,043,800 B2
Chanda et al.  (45) Date of Patent: May 26, 2015

(54) VIDEO PLAYER INSTANCE PRIORITIZATION

(75) Inventors: Rupen Chanda, San Francisco, CA (US); Minghao Wang, Fremont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 983 days.

(21) Appl. No.: 13/116,937

(22) Filed: May 26, 2011

(65) Prior Publication Data

US 2013/0132966 A1  May 23, 2013

(51) Int. Cl.
*G06F 9/46* (2006.01)
*H04N 21/426* (2011.01)
*H04N 21/442* (2011.01)
*H04N 21/443* (2011.01)
*G06F 9/50* (2006.01)

(52) U.S. Cl.
CPC ............ *H04N 21/42607* (2013.01); *G06F 9/50* (2013.01); *H04N 21/4424* (2013.01); *H04N 21/443* (2013.01)

(58) Field of Classification Search
None
See application file for complete search history.

(56) References Cited

U.S. PATENT DOCUMENTS

| 6,016,166 | A  | * | 1/2000 | Huang et al. ................. 348/515 |
| 6,384,846 | B1 | * | 5/2002 | Hiroi .............................. 715/794 |
| 2007/0083868 | A1 | * | 4/2007 | Sankaranarayan et al. ... 718/104 |
| 2008/0187053 | A1 | * | 8/2008 | Zhao et al. ............... 375/240.25 |
| 2009/0182889 | A1 |   | 7/2009 | Hurst et al. |
| 2010/0067576 | A1 | * | 3/2010 | Haskell et al. ........... 375/240.12 |

* cited by examiner

*Primary Examiner* — Kenneth Tang
(74) *Attorney, Agent, or Firm* — Wolfe-SBMC (57) ABSTRACT

A video player instance may be prioritized and decoding and rendering resources may be assigned to the video player instance accordingly. A video player instance may request use of a resource combination. Based on a determined priority a resource combination may be assigned to the video player instance. A resource combination may be reassigned to another video player instance upon detection that the previously assigned resource combination is no longer actively in use.

20 Claims, 4 Drawing Sheets

VIDEO PLAYER INSTANCE PRIORITIZATION

BACKGROUND

1. Technical Field

This disclosure relates generally to video players, and more specifically, to multiple instances of video players.

2. Description of the Related Art

Complex web pages may require multiple instances of video players. For example, a website may include advertisement content, followed by television program content, followed by another advertisement, followed by the remainder of the television program content. The two advertisements and the television program may represent three separate instances of the video player. Existing video players may not be capable of displaying multiple video player instances because neither the player nor the hardware supports multiple video player instances. Thus, if a user attempts to open another video while playing a video, the other video simply will not play back or may only be capable of using software resources at a diminished bit rate.

SUMMARY

This disclosure describes techniques and structures for prioritizing instances of a video player. In one embodiment, an instance of a video player may request to display video content associated with a video player instance. A resource manager may determine a priority of the video player instance and may assign a resource combination, including an appropriate one of a plurality of decoding resources and an appropriate one of a plurality of rendering resources, to the video player instance based on the determined priority.

In one embodiment, another instance of the video player may request to display video content associated with another video player instance. The resource manager may determine a priority of the another video player instance and may assign another resource combination to the another video player instance, including another one of the plurality of decoder resources and another one of the plurality of rendering resources, based on the determined priority of the another video player instance.

In various embodiments, the resource manager may detect that the previously assigned resource combination is no longer in use by but is still being occupied by the video player instance. The resource manager may determine a priority of the another video player instance and may determine that the previously assigned resource combination is appropriate based on the priority of the another video player instance. The same resource combination that was previously assigned to the video player instance may be reassigned to the another video player instance. In one embodiment, the video player instance may request to resume display of the video content associated with the video player instance. The resource manager may determine that the resource combination has been reassigned. The resource manager may then re-determine the priority of the video player instance and may assign another resource combination to the video player instance, including another one of the plurality of decoder resources and another one of the plurality of rendering resources, based on the re-determined priority of the video player instance.

While the disclosure is described herein by way of example for several embodiments and illustrative drawings, those skilled in the art will recognize that the disclosure is not limited to the embodiments or drawings described. It should be understood, that the drawings and detailed description thereto are not intended to limit the disclosure to the particular form disclosed, but on the contrary, the intention is to cover all modifications, equivalents and alternatives falling within the spirit and scope of the present disclosure. The headings used herein are for organizational purposes only and are not meant to be used to limit the scope of the description. As used throughout this application, the word "may" is used in a permissive sense (e.g., meaning having the potential to), rather than the mandatory sense (e.g., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

"First," "Second," etc. As used herein, these terms are used as labels for nouns that they precede, and do not imply any type of ordering (e.g., spatial, temporal, logical, etc.). For example, in a processor having four instances of a video player, the terms "first" and "second" video player instances can be used to refer to any two of the four video player instances. In other words, the "first" and "second" video player instances are not limited to logical processing elements 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Various embodiments of methods and apparatus for prioritizing a video player instance and assigning a resource combination to that video player instance are described. Some embodiments may include a means for determining a video player instance priority and a means for assigning a resource combination (e.g., decoding, rendering, and compositing resources) to the video player instance. For example, a resource manager may receive a request to display video content associated with a video player instance. The resource manager may determine a priority of the video player instance based on a number of criteria. The resource manager may assign a resource combination to the video player instance based on the determined priority. The resource manager may, in some embodiments, be implemented by program instructions stored in a computer-readable storage medium and executable by one or more processors (e.g., one or more CPUs or GPUs) of a computing apparatus. The computer-readable storage medium may store program instructions executable by the one or more processors to cause the computing apparatus to perform receiving a request to display video content associated with a video player instance, determining a priority of the video player instance, and assigning a resource combination to the video player instance based on the determined priority, as described herein. Other embodiments of the resource manager may be at least partially implemented by hardware circuitry and/or firmware stored, for example, in a non-volatile memory.

Figure 1:
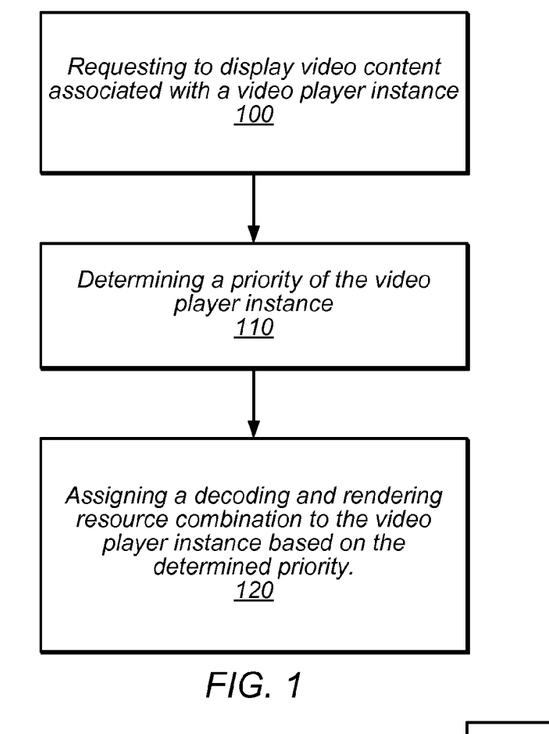
FIGS. 1-4 are flowcharts of example methods for prioritizing a video player instance and assigning a resource combination to that video player instance, according to some embodiments.

Turning now to FIG. 1, one embodiment for prioritizing a video player instance and assigning an appropriate resource combination is shown. While the blocks are shown in a particular order for ease of understanding, other orders may be used. In some embodiments, the method of FIG. 1 may include additional (or fewer) blocks than shown. Blocks 100-120 may be performed automatically or may receive user input.

As indicated at 100, an instance of a video player may request to display video content associated with the video player instance. Video may be displayed via a display path that includes a combination of a decoding resource and a rendering resource, which may be referred to as a resource combination. A decoding resource may be a hardware resource configured to decode a video input, which may include compression decoding. A rendering resource may be a hardware resource configured to render and/or composite a video input. The request to display video content may be a generic request and not for a specific resource combination. As described herein, an instance of a video player is a unique instantiation of a video player relating to corresponding video content. For example, consider a scenario in which a user watches a television program through a web browser. In many cases, one or more video advertisements may precede the actual television program content. Each advertisement and the television program may be video player instances. Thus, if two advertisements precede television program content, the full sequence of advertisements and television program content may be three instances of the video player, even though, to a viewer, it appears as one sequential video. In the television program example, each instance of the video player may request to display video content associated with the respective video player instance in response to a user input or as part of an automated request of the television program sequence. The requests may all occur at the time of the initial selection of the television program or each request may occur shortly before the video player is ready to play the video content corresponding to each video player instance.

In addition to the television program example in which the advertisements and content appear sequential to a viewer, in another example, multiple instances of the video player may occur as simultaneous videos. For example, in a web browser, main video content may be located in the center of the webpage while other video content (e.g., advertisements) may appear in a less prominent region (e.g., corner of the webpage) simultaneously with the main content. Each video content may correspond to a unique instance of the video player. Thus, as a simple example, if a webpage displays main video content and an advertisement simultaneously, each of the two portions of content, main and advertisement, may correspond to its own instance of the video player and each video player instance may request to display its respective associated video content.

Video content may include hardware accelerated or hardware decoded video. In one embodiment, video content may be encoded using an accelerated codec (e.g., H.264). Video encoded with an accelerated codec may facilitate full GPU acceleration through display. For example, the received multimedia content may include a 3D graphics layer. In various embodiments, video content may be rendered as YUV (Y'UV) data or RGB data. In some embodiments, video content may be rendered separately from other content to facilitate full hardware acceleration. In addition, other content may be present with the video content, such as 3D and/or vector graphics content.

At 110, a priority of the video player instance may be determined. In one embodiment, the priority of the video player instance may be determined by a resource manager. The resource manager may be implemented as program instructions on a computer readable storage medium or in hardware. The resource manager may include priority logic or a prioritization table. In various embodiments, the resource manager may use one or more criteria to determine the priority of a video player instance. In various embodiments, the resource manager may be a global resource manager managing multiple video players and determining the respective priorities of each of those multiple video player instances. For example, in one embodiment, the resource manager may receive video profile information, metadata, or a video object header corresponding to the video content of the video player instance. In some embodiments, the resource manager may receive as input a size, resolution, active status (e.g., actively providing data to the video decoder, in the background, paused, etc.), timing of the request, and/or location (e.g., center, or upper corner of the webpage, etc.), among other criteria corresponding to video content of the video player instance. Video complexity may also be a factor in the priority determination. For instance, the most difficult video (e.g., 1080p) that has the highest bit rate may, in some embodiments, be determined as the highest priority. Priority determination may be based on thresholds of various criteria.

As one example, consider a video player instance that corresponds to an advertisement. The resource manager may receive a video profile of the advertisement video content indicating it is an advertisement as well as receive information that the advertisement is 220×240 resolution. Either or both factors may be used in the priority logic to determine that the advertisement is a lower priority and that less powerful resources and a less than the most efficient display path (e.g., decoding, rendering, compositing resources, etc.) may be adequate for the advertisement. For less complex videos, the less efficient path may still provide a 30 frames per second (fps) path.

As another example, consider a video player instance that corresponds to 720p video content that is not an advertisement. Priority logic of the resource manager may determine that such an example is higher priority than the above advertisement example and may determine that a more efficient path is appropriate for the video player instance corresponding to the 720p video content.

Another example may include a video player instance corresponding to 1080p video content that is centered on the webpage and is active. Priority logic of the resource manager may determine that such a video player instance is even higher than that of the 720p example above. In some embodiments, as described herein, the 720p associated video player instance may have initiated its request earlier in time than the 1080p associated video player instance and may already be assigned the most efficient resources. In such a scenario, the 1080p associated video player instance may be assigned the next most efficient resources and display path. The priority logic may determine that the 1080p associated video player instance is actually lower priority than the 720p associated video player instance because it was later in time, or it may determine that the 1080p associated video player instance is higher in priority but due to available resources, it may be assigned less efficient resources. Thus, timing of the video player instance request for a resource combination may be a factor in the priority determination.

The priority logic may include a table that scores and/or weights the various factors to determine the priority of a video player instance. The table may include continuous scoring of the factors or may include thresholds for each factor to provide a discrete scoring of the factors. Some factors may override other factors. For example, a video player instance corresponding to 1080p video content may be scored as higher priority than an advertisement, regardless of the other factors. Thus, the 1080p video player instance may be in the background or paused while the advertisement video player instance is active and centered on the webpage, yet the 1080p video player instance may be determined as higher priority and therefore may be assigned more efficient resources. In some embodiments, the initial priority determination may occur on a first come, first served basis or weight such first come timing higher in the prioritization logic than in subsequent requests. Thus, along the lines of the 720p versus 1080p example above, if the 720p video player instance was first in time, it may be provided a higher priority over the later in time 1080p video player instance. But in the case of a first-in-time advertisement, the priority logic may determine that the advertisement is lower priority and that less efficient resources may be sufficient. As a result, the more efficient resources may be reserved for potential later-in-time, higher resolution video content. The priorities assigned to various video player instances may include a priority flag or a numerical priority rating.

In some embodiments, the resource manager may be a hypervisor type component managing the resources. A hook in the operating system may share information about processes across a boundary. Accordingly, information may be shared to the operating system in shared memory between processes.

As shown at 120, a resource combination may be assigned to the video player instance based on the determined priority. The resource combination may include an appropriate one of the plurality of decoding resources and an appropriate one of the plurality of rendering resources. In one embodiment, decoding resources may include a hardware video decoder and a software decoding module executed on a central processing unit (CPU). A hardware video decoder may be a separate external resource in the system or hardware decoding within a graphics processing unit (GPU). The decoding module may perform software decoding. A hardware video decoder may be a separate hardware resource in the system. In one embodiment, the hardware video decoder may perform one decoding at a time. In some embodiments, the hardware video decoder may perform multiple parallel decodings (e.g., four). The number of parallel decodings may depend on the resolution of the video content. For example, if each video content input is 480p, the hardware video decoder may perform four parallel decodings. If the video content is 1080p, the hardware video decoder may perform one 1080p decoding and one 220p decoding in parallel. Each separate decoding may be referred to as a different hardware decoder, even if part of the same physical component. Thus, if the hardware video decoder can perform four parallel decodings, each of the four parallel decodings may be a separate decoding resource, even though the same piece of hardware is performing all four decodings.

Rendering resources may include an overlay engine, a GPU, and a rendering module executed on a CPU. Both the overlay engine and GPU may perform hardware rendering/compositing while the rendering module may perform software rendering. Some examples of resource combinations include: hardware decoding (e.g., hardware video decoder) and hardware rendering/compositing (e.g., overlay engine or GPU), hardware decoding and software rendering, and software decoding and software rendering. In one embodiment, the combinations may be associated with a priority. For instance, a higher priority video player instance may be assigned a higher priority resource combination. One example priority sequence of the resource combinations may be, from highest to lowest: hardware decoding and overlay engine rendering/compositing, hardware decoding and GPU rendering/compositing, hardware decoding and software rendering/compositing, and software decoding and software rendering/compositing. Thus, a high priority video player instance (e.g., corresponding to 1080p video content) may be assigned a hardware video decoder and an overlay engine while a video player instance corresponding to a small off-centered advertisement may be assigned a resource combination that includes decoding and rendering/compositing modules, implemented on a CPU. In some instances, even if the video instance corresponding to the small, off-centered advertisement is the first and only video instance at the time, the resource manager may assign a less efficient resource combination yet still provide 30 fps. In other instances, if a lower bit rate video comes in (e.g., 480p) and the resource manager does not know what other video sources may come in the future, the 480p associated video player instance may be assigned the best resource combination. If a video player instance corresponding to 1080p is instantiated later, the 1080p associated video player instance may receive lesser resources, or, as described at FIG. 3, the resource combination previously assigned to the 480p associated video player instance may, in some circumstances, be taken and reassigned to the 1080p associated video player instance.

Figure 2:
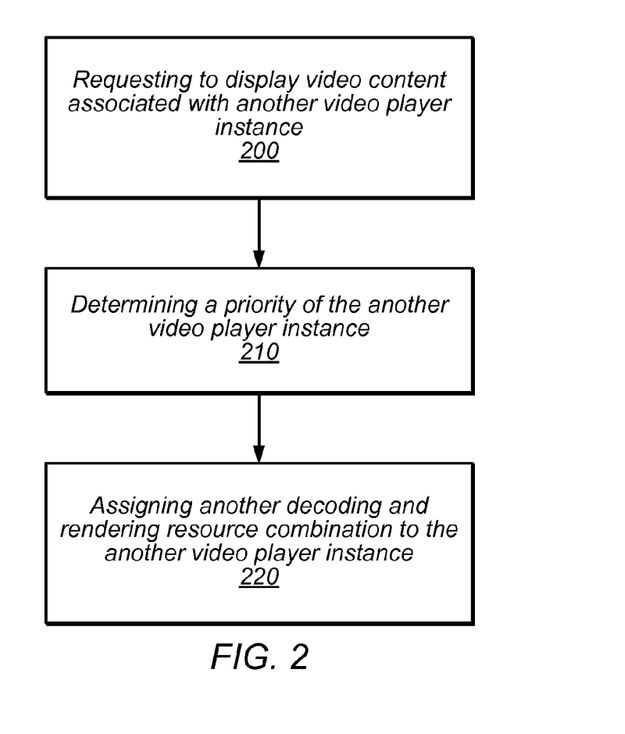

Turning now to FIG. 2, one embodiment for prioritizing a video player instance and assigning a resource combination to the video player instance is shown. While the blocks are shown in a particular order for ease of understanding, other orders may be used. In some embodiments, the method of FIG. 2 may include additional (or fewer) blocks than shown. Blocks 200-220 may be performed automatically or may receive user input. In addition, the method of FIG. 2 may be used in conjunction with the method of FIG. 1 and may occur simultaneously with the method of FIG. 1.

As illustrated at 200, another instance of the video player may request to display video content associated with the another video player instance. As above, the request may not be for a specific resource combination but may be a general request for a resource combination. Another instance may correspond to a different video object in a sequence of video objects, as in the television program example, or it may be another video object of multiple simultaneously playing videos on the same web page. Continuing the television program example, let the video player instance of block 100 correspond to advertisement content and the another video player instance of block 200 correspond to the actual television program content. In one embodiment, the request to display video content may occur at a time shortly before the video content is ready to play. As an example of the timing of such an embodiment, the video player instance corresponding to the advertisement may request to display video content at block 100 before the video player instance corresponding to the television program content may request to display video content at block 200. In some embodiments, the request may occur simultaneously for all video player instances relating to a video sequence (e.g., the advertisement-television program combination). Thus, the request for both video player instances, at blocks 100 and 200, may occur simultaneously. In any event, the prioritization at blocks 110 and 210 may account for later in time requests in the prioritization scheme (e.g., in some cases, assigning a lower priority resource for a first in time request, such as for an advertisement).

As shown at 210, the priority of the another video player instance may be determined. In determining priority, the prioritization scheme may or may not take into account other video player instances. In assigning resources, however, the prioritization logic may take into effect other video player instances. For example, a first-in-time video instance may correspond to a very high quality but slightly lesser quality video than the later-in-time instance. As a result, the first in time video instance may have already been assigned the most efficient resource path (e.g., hardware decoding and overly engine rendering/compositing). Nevertheless, the later in time video player instance, corresponding to higher quality video content, may be assigned higher priority than the first in time video player instance. Thus, in this example, the prioritization scheme may not take into account other video player instances at least for the purpose of determining priority.

At 220, another resource combination may be assigned to the video player instance based on the determined priority of the another video player instance. The another resource combination may include another one of the plurality of decoding resources and another one of the plurality of rendering resources. Accordingly, extending the example of block 210, if a first-in-time video instance has already been assigned a resource combination, and is actively using the resource combination (e.g., the video content is not paused, in the background, etc.), the later-in-time video instance may not be assigned the same resource combination. Thus, if the system includes one hardware decoder and one overlay engine and they are currently assigned to the first-in-time instance, a resource combination including that hardware decoder component and the overlay engine may not be assigned to the later-in-time instance.

Referring again to the television program example, this time including an advertisement before the television program content, the television program content, and another advertisement between two segments of the television program content. According to the method of FIG. 1, the priority may be determined for the video player instance corresponding to the first advertisement and a resource combination may be assigned to that instance, for example, a software decoder and a GPU rendering/compositing component. According to the method of FIG. 2, the priority for the video player instance corresponding to the television program content and the second advertisement may be determined and respective resource combinations may be assigned, for instance, a hardware decoder and overlay engine for the program content associated video player instance and another hardware decoder and software rendering module for the second advertisement associated video player instance. When the television program content is playing, the full video pipeline may be filled. As an example, the television program content may pause and an advertisement may be inserted at the ten minute mark. Different decoding resources may be used, as described herein, because the main video pipeline is filled. From a content perspective, the advertisements and the program content are parallel and not sequential. Thus, video decoding may be performed in parallel by using the different resources and as a result, the complete video presentation may appear sequentially to a viewer without gaps in playback.

Prioritizing the video player instances that correspond to respective video content may allow for full hardware acceleration of higher priority video, from decoding to presentation. In addition, certain video content may be processed with less efficient resources so that the more efficient resources may be preserved for more resource intensive video content.

Figure 3:
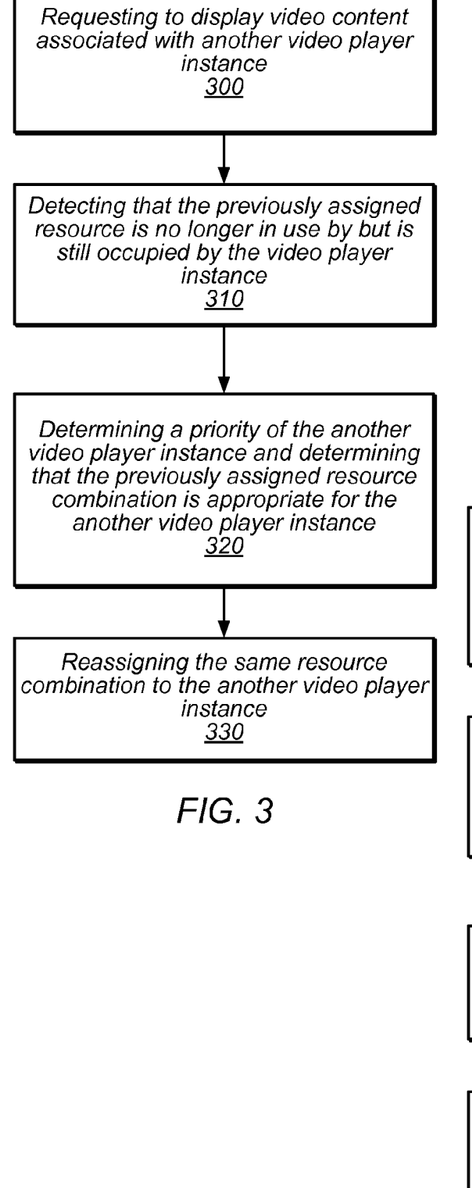

Turning now to FIG. 3, one embodiment for prioritizing a video player instance is shown. While the blocks are shown in a particular order for ease of understanding, other orders may be used. In some embodiments, the method of FIG. 3 may include additional (or fewer) blocks than shown. Blocks 300-330 may be performed automatically or may receive user input. In addition, the method of FIG. 3 may be used in conjunction with the methods of FIGS. 1 and 2 and may occur simultaneously with the methods of FIGS. 1 and 2.

As illustrated at 300 and similar to block 200, another instance of the video player may request to display video content associated with the another video player instance. As above, the request may not be for a specific resource combination but may be a general request for a resource combination.

As shown at 310, the resource manager may detect that the previously assigned resource combination is no longer in use by but is still being occupied by the video player instance. A previously assigned resource combination may no longer be in use by the video player instance if the video player instance is in the background (e.g., minimized browser, different browser tab than the active tab, etc.), paused, or not active. In one embodiment, the detection may be based in part on whether the video pipeline corresponding to the resource combination is fully filled. For instance, a half-filled video pipeline may correspond to a paused video state. Further, the detection may include detecting whether the video codec is active (e.g., whether content is being pushed to the decoder). As another example of a situation where a resource combination is no longer in use by a video player instance, a web browser may initially only have one tab, with four video player instances actively running such that four resource combinations are being utilized. A user may click on an advertisement that may start a new video player instance in a new tab of the browser and make the new tab active. In such an example, the four video player instances may no longer be active and the resource manager may detect that the previously assigned resource combinations are no longer in use by but are still being occupied by the video player instances. A resource combination may still be occupied by a video player instance even when its corresponding video content is finished. Because of the way content is typically designed, the content may not destroy a video player instance and therefore may hold onto a resource combination beyond what is necessary to complete playback of video content. Thus, in the television program example, even after the advertisement content is finished playing, the advertisement content may not close itself but instead may continue to occupy its assigned resource combination. At 310, the resource manager may detect that the resource combination assigned to the video player instance corresponding to the advertisement is no longer in use but is still occupied by that video player instance.

In one embodiment, detection that a resource combination is no longer in use may occur in response to a request to use a resource combination, as in blocks 100, 200, or 300. In some embodiments, detection may occur when active content is finished, (e.g., when no more content is pushed to the decoder). Thus, the resource manager may continually or periodically monitor the various decoders or video input streams to determine when active content is finished. As a result, in such an embodiment, the resource manager may store information on which resource combinations are active and assigned, which are assigned but not active, and which are neither assigned, nor active. Such information may be stored to the operating system shared memory between processes.

At 320, the resource manager may determine a priority of the another video player and determine that the previously assigned resource combination is appropriate for the another video player instance based on its determined priority. Consider the example above that included a first-in-time video player instance corresponding to 720p main video content and a later-in-time video player instance corresponding to 1080p main video content. The 720p associated video player instance may have been previously assigned the best resource combination, which may in some embodiments be a hardware decoder and an overlay engine for rendering/compositing, but is no longer active. The resource manager in such an example may determine the priority of the 1080p video player instance. The resource manager may further determine that the previously assigned resource combination of a hardware decoder and overlay engine for rendering/compositing may be appropriate for the 1080p associated video player instance based on its determined priority.

As illustrated at 330, the resource combination that was previously assigned to the video player instance may be reassigned to the another video player instance. Thus, the existing resource combination may be preempted and reused. Continuing the 720p/1080p example, the hardware decoder and overlay engine that were previously assigned to the 720p associated video player instance may be reassigned to the 1080p associated video player instance. In some embodiments, another resource combination may be assigned to the non-active video player instance at the same time the previous resource combination is reassigned to the another video player instance. In other embodiments, another resource combination may not be assigned to the non-active video player instance that previously used the reassigned resource combination until that video player instance is active again. At that point, the resource manager may re-determine the priority of the video player instance and assign a new resource combination accordingly, as described at FIG. 4.

Figure 4:
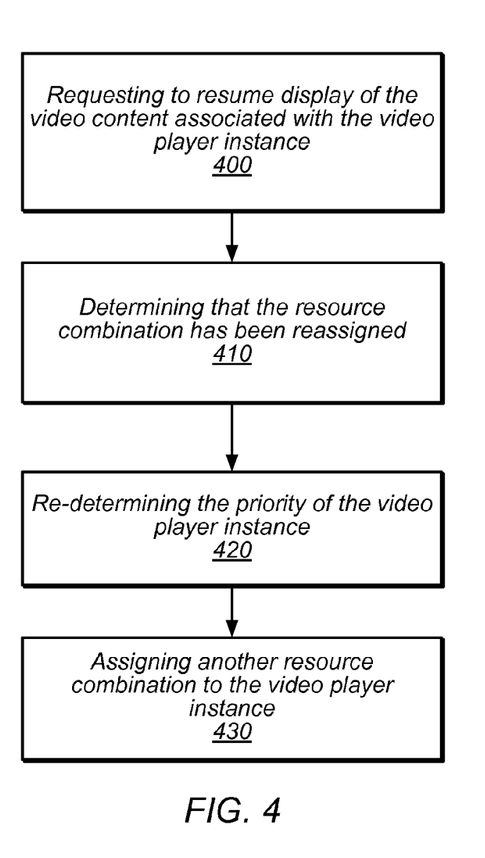

Turning now to FIG. 4, one embodiment for prioritizing a video player instance and assigning a resource combination to the video player instance is shown. While the blocks are shown in a particular order for ease of understanding, other orders may be used. In some embodiments, the method of FIG. 4 may include additional (or fewer) blocks than shown. Blocks 400-430 may be performed automatically or may receive user input. In addition, the method of FIG. 4 may be used in conjunction with one or more of the methods of FIGS. 1-3 and may occur simultaneously with one or more of the methods of FIGS. 1-3.

As illustrated at 400, the instance of the video player may request to resume display of the video content associated with the video player instance. In one embodiment, if the resource combination has not been reassigned and the content has not released the resource combination, the video player instance may resume playback using the same resource combination. Thus, if the video player instance and corresponding content were in a paused state, the playback may resume without re-determining a priority and without reassigning resources. In some embodiments, however, a re-determination of priority may occur and a reassignment of an appropriate resource combination may also occur to reflect the updated priority. The request to resume display of the video content may include a request to confirm that the previously assigned resource combination is still assigned to the video player instance (e.g., has not been reassigned to another video player instance).

As shown at 410, the resource manager may determine that the resource combination has been reassigned. For instance, the video player instance may have previously utilized a resource combination but while the video player instance was not-active (e.g., paused, in the background, minimized, etc.), the resource combination may have been reassigned to another video player instance. In one embodiment, the resource manager may store a list of video player instances and hardware resources such that the resource manager may read the stored list to determine if the resource combination has been reassigned. The resource manager may determine that the resource combination is still assigned to the video player instance and provide an indication to the video player instance that it may resume play with the same resource combination without re-determining the video player instance's priority. Even if the resource combination has not been reassigned, the resource manager may, in some embodiments, nevertheless re-determine the priority of the video player instance at block 420.

At 420, the resource manager may re-determine the priority of the video player instance. In one embodiment, the re-determination may be performed in the same or similar fashion as the original determination in blocks 110 or 210. In some embodiments, the priority logic may take into consideration a prior priority determination. Included as part of the previous determination, the priority logic may consider a previously assigned resource combination for that video player instance. For example, if a video player instance was previously assigned a resource combination that has not been reassigned, that may factor into the redetermination of priority for the video player instance. If the resource combination has been reassigned, the priority logic may or may not factor in the previous priority determination.

As illustrated at 430, another resource combination may be assigned to the video player instance based on the re-determined priority. The another resource combination may include another one of the plurality of decoder resources and another one of the plurality of rendering resources. For a single hardware decoder that is configured to handle multiple video streams (e.g., 2, 4, etc.), use of another decoder input of that same single hardware decoder may be referred to as another one of the plurality of decoder resources. Thus, if a video player instance was previously assigned a hardware decoder resource and an overlay engine for rendering/compositing and, after the re-determination of priority, is then assigned to another input of the hardware decoder resource and a GPU for rendering/compositing, the new assignment of a resource combination constitutes another one of the plurality of decoder resources and another one of the plurality of rendering resources. Likewise, if the system includes multiple GPUs and/or multiple overlay engines and the new assignment results in using a different GPU or overlay engine of the multiple GPUs and/or overlay engines, the new assignment of a resource combination constitutes another one of the plurality of decoder resources and another one of the plurality of rendering resources even though the original assignment and new assignment may each use, for example, a hardware decoder as a decoding resource and a GPU as a rendering/compositing resource. Thus, in terms of uniqueness of a resource combination, one input to a hardware decoder may be different than other inputs to the same hardware decoder and each input and associated circuitry may constitute a unique resource. Further, in a system with multiple GPUs, one GPU is a different hardware resource (e.g., rendering, compositing, etc.) than another GPU.

By using priority logic to determine a priority of a video player instance and assigning a resource combination based on that determined priority, complex web pages may be supported, even in mobile devices or systems with limited hardware resources. Complex web pages may be supported in a manner that is transparent to the actual video content. Further, the methods of FIGS. 1-3 may allow for efficient reuse of resources that may otherwise be wasted on background or inactive video content.

Example Implementations

Figure 5:
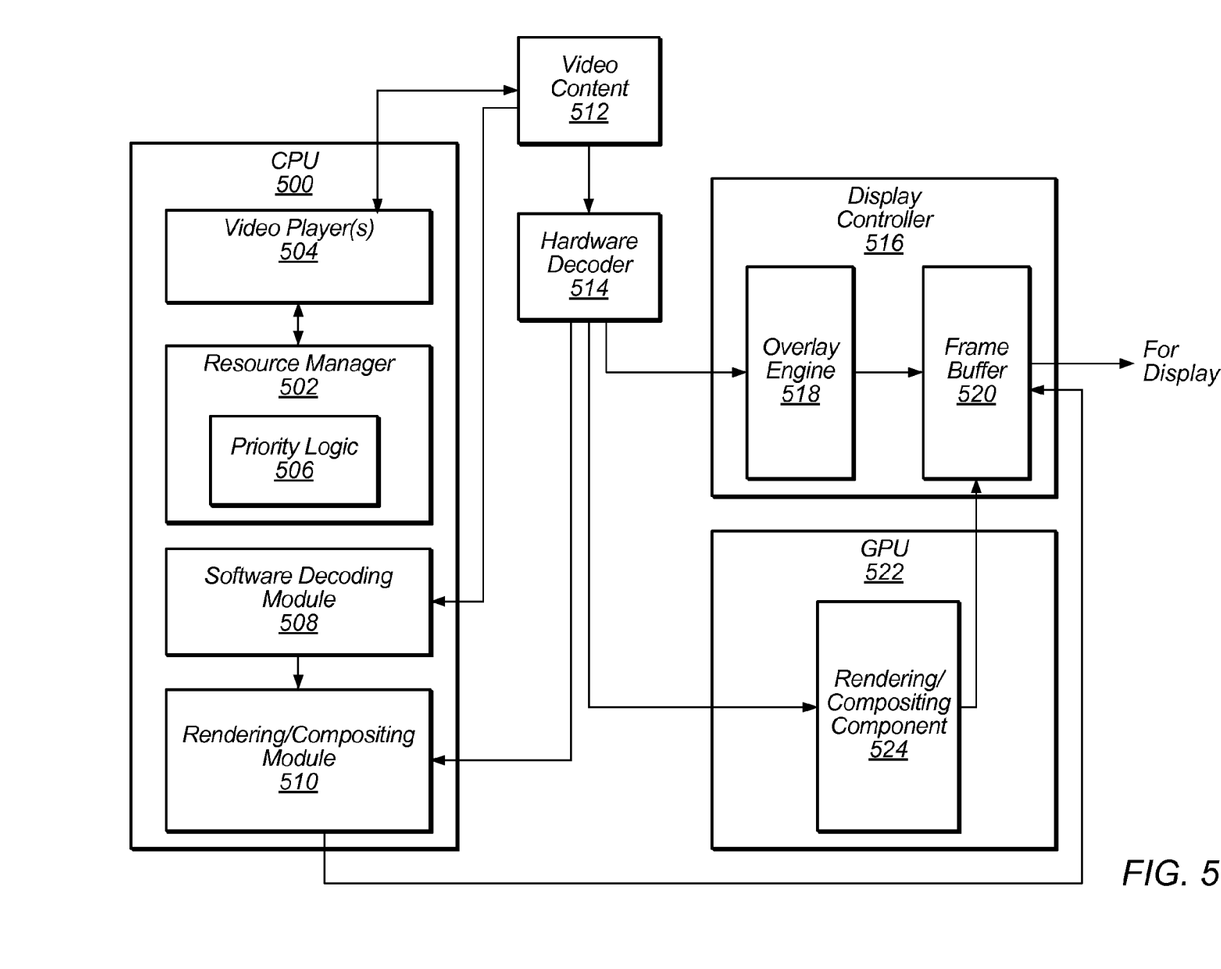
FIG. 5 illustrates a block diagram of one embodiment of prioritizing a video player instance and assigning a resource combination to that video player instance.

FIG. 5 illustrates a block diagram of one embodiment of prioritizing a video player instance and assigning a resource combination to that video player instance. In one embodiment, video content 512 may be received by video player 504. Video content 512 may be associated with an instance of video player 504. Video player 504, which may be executed on CPU 500 of a computing device and managed by resource manager 502. Resource manager 502 may be a global resource manager managing multiple video players 504. Resource manager 502 may determine a priority of the video player instance. In one embodiment, the determining may be performed by priority logic 506. Based on the determined priority, resource manager 502 may assign a decoding resource from a plurality of decoding resources (e.g., one or more hardware decoders 514, software decoding module 508, etc.) and a rendering resource (e.g., overly engine 518, GPU 522, rendering module 510, etc.). Like resource manager 502, software decoding module 508 and rendering/compositing module 510 may also be executed on CPU 500. The illustrated embodiment shows one video content 512 and one video hardware decoder 514. Not shown, more than one video content 512 may be received by media player 504 and multiple hardware decoders 514 may be configured to receive the various video content 512. Multiple hardware decoders 514 may be distinct components or may be distinct circuitry/paths within a single component. After being assigned a respective resource combination, the corresponding video content 512 for that video player instance may use the display path consisting of the determined decoding resource and rendering resource. As shown, overlay engine 518 may be a component of display controller 516. Display controller 516 may also include frame buffer 520 that may receive the final frame content from the various display paths/pipelines to provide to the display. Thus, anything that is to be written to the display may go through display controller 516. A driver executed on CPU 500 may determine how the final frame is composited.

As an example, four different video content 512 may be associated with four separate video player instances. In a web browser, the first two instances may be advertisements the third instance may be the feature video (1080p), and the fourth instance may be another advertisement that is presented in the middle of the feature video. Media player 504, after determining the priorities of the various video player instances may assign a resource combination to each video player instance. For example, the first instance may be assigned a hardware decoder and the rendering module; the second instance may be assigned the software decoding module and the rendering module; the third instance may be assigned a hardware decoder and overlay engine; and the fourth instance may be assigned the software decoding module and the rendering module. The priority determination may occur in response to a request for the feature video presentation (along with its advertisements). The priorities for all four video player instances may be determined simultaneously or may occur shortly before the video playback for that video player instance is scheduled to begin.

Continuing the example, a later-in-time video content 512 may be received by video player 402 at a point in time after the 1080p video finished playing. As an example, the later-in-time video content 512 may be 720p video content. The priority of the video player instance corresponding to the 720p video content may be determined. In one embodiment, resource manager 502 may reassign the hardware decoder and overlay engine resource combination to the 720p associated video player instance. Thus, resources no longer in use may be reassigned to other video player instances, which may make more efficient use of the available resources.

Example System

Figure 6:
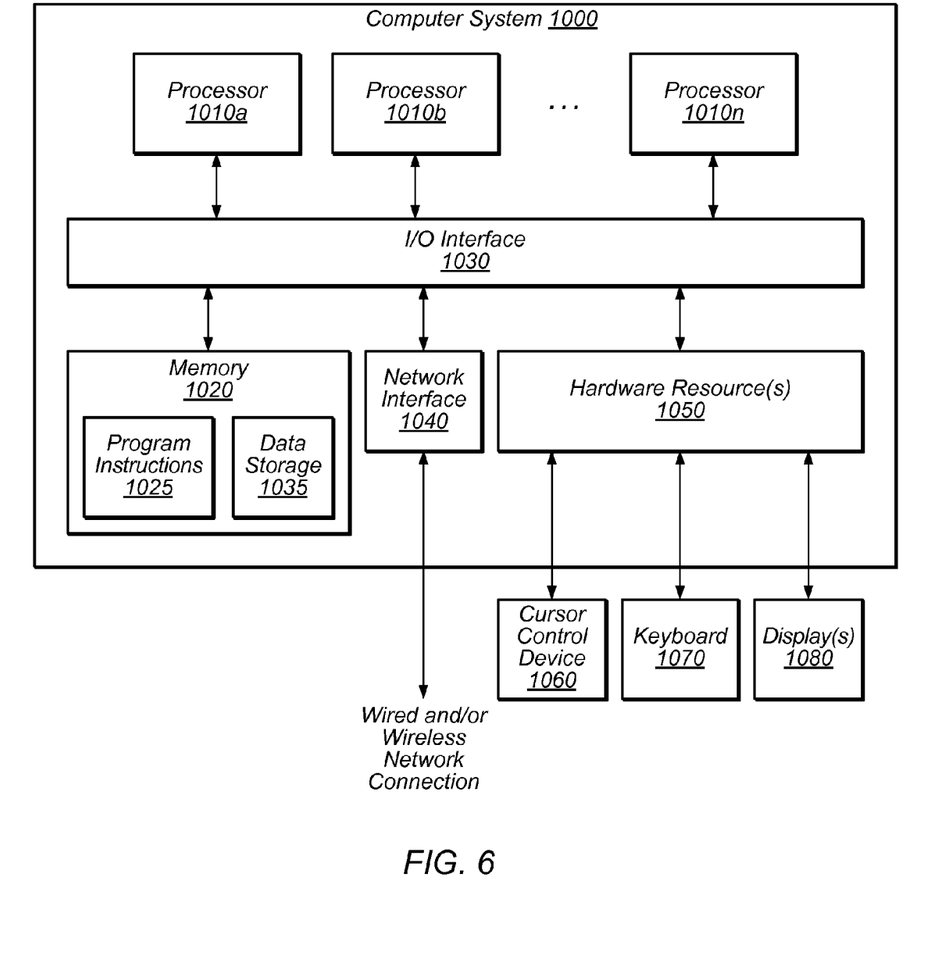
FIG. 6 illustrates an example computer system that may be used in embodiments.

FIG. 6 illustrates a device that may allow for prioritization of a video player instance and assignment of a resource combination to that video player instance according to the various priority determining and resource assigning techniques, as described herein. The device may interact with various other devices. One such computer system is illustrated by FIG. 6. In different embodiments, computer system 1000 may be any of various types of devices, including, but not limited to, a personal computer system, desktop computer, laptop, notebook, tablet device, or netbook computer, mainframe computer system, handheld computer, workstation, network computer, a camera, television, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more hardware resources, such as processor(s) 1010 and hardware resource(s) 1050, at least some of which may be coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a GPU. A GPU may be considered a dedicated graphics-rendering device for a personal computer, workstation, game console, mobile device, or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more APIs that permit programmers to invoke the functionality of the GPU(s). Suitable GPUs may be commercially available from vendors such as NVIDIA Corporation, ATI Technologies (AMD), and others.

GPUs, such as one or more of processors 1010 may be implemented in a number of different physical forms. For example, GPUs may take the form of a dedicated graphics card, an integrated graphics solution and/or a hybrid solution. The dedicated graphics card may be a 3D graphics card. GPU 1010 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth. Hybrid solutions may also share memory with the system memory, but may have a smaller amount of memory on-board than discrete or dedicated graphics cards to make up for the high latency of system RAM. Data communicated between the graphics processing unit 1010 and the rest of the computer system 1000 may travel through a graphics card slot or other interface, such as I/O interface 1030 of FIG. 6.

Note that program instructions 1025 may be configured to implement a graphics application (e.g., a multimedia player, as described herein) as a stand-alone application, or as a module of another graphics application or graphics library, in various embodiments. For example, in one embodiment program instructions 1025 may be configured to implement graphics applications such as painting, editing, publishing, photography, games, animation, and/or other applications, and may be configured to provide the functionality described herein. In another embodiment, program instructions 1025 may be configured to implement the techniques described herein in one or more functions or modules called by another graphics application executed on GPU 1010 and/or processor(s) 1010 (e.g., a resource manager, a software decoding module, and/or a rendering module). These modules may be executable on one or more of CPUs 1010 and/or GPUs 1010 to cause computer system 1000 to provide the functionality described herein. The graphics application may be implemented in various embodiments using any desired programming language, scripting language, or combination of programming languages and/or scripting languages, e.g., C, C++, C#, Java™, Perl, etc. For example, in one embodiment, the graphics application may be JAVA based, while in another embodiment, it may be implemented using the C or C++ programming languages. In other embodiments, the graphics application may be implemented using specific graphic languages specifically for developing programs executed by specialized graphics hardware, such as a GPU. In addition, the graphics application may be embodied on memory specifically allocated for use by graphics processor(s), such as memory on a graphics board including graphics processor(s). Program instructions 1025 may also be configured to render images and present them on one or more displays as the output of an operation and/or to store image data in memory 1020 and/or an external storage device(s), in various embodiments.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a resource manager, software decoding module, and a rendering module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as hardware resources 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Hardware resources 1050 may, in some embodiments, support one or more display terminals, keyboards, keypads, touchpads, scanning devices, voice or optical recognition devices, or any other devices suitable for entering or retrieving data by one or more computer system 1000. Multiple hardware resources 1050 may be present in computer system 1000 or may be distributed on various nodes of computer system 1000. In some embodiments, similar hardware resources may be separate from computer system 1000 and may interact with one or more nodes of computer system 1000 through a wired or wireless connection, such as over network interface 1040. Hardware resources 1050 may also include a display controller and/or an overlay engine that may be used to sample, render, and composite the various video content to provide to display(s) 1080. In one embodiment, a display controller may further include a frame buffer that may store frames to be provided to display(s) 1080. Hardware resources 1050 may also include one or more video decoders, and/or other rendering or compositing hardware.

As shown in FIG. 6, memory 1020 may include program instructions 1025, configured to implement embodiments of a resource manager, a software decoding module, and a rendering module as described herein, and data storage 1035, comprising various data accessible by program instructions 1025. In one embodiment, program instructions 1025 may include software elements of embodiments of a resource manager, software decoding modules, and/or rendering modules as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of compositing and sampling modules, as described herein. In particular, the computer system and devices may include any combination of hardware or software that can perform the indicated functions, including a computer, personal computer system, desktop computer, laptop, notebook, or netbook computer, tablet device, mainframe computer system, handheld computer, workstation, network computer, a camera, a set top box, television, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present disclosure may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the disclosure embrace all such modifications and changes and, accordingly, the above description to be regarded in an illustrative rather than a restrictive sense.

What is claimed is:

1. A method, comprising:
    associating a priority, by a resource manager, to each one of a plurality of resource combinations, each one of the plurality of resource combinations comprising a determined one of a plurality of decoding resources and a determined one of a plurality of rendering resources;
    requesting to display video content associated with a video player instance;
    determining a priority, by the resource manager, of the video player instance; and
    assigning the prioritized video player instance to one of the plurality of prioritized resource combinations.

2. The method of claim 1, further comprising:
    requesting to display video content associated with another video player instance;
    the resource manager determining a priority of the another video player instance; and
    assigning another one of the plurality of prioritized resource combinations to the another video player instance based on the determined priority of the another video player instance, wherein the another one of the plurality of prioritized resource combinations comprises another determined one of the plurality of decoder resources and another determined one of the plurality of rendering resources.

3. The method of claim 1, further comprising:
    requesting to display video content associated with another video player instance;
    detecting that the previously assigned one of the plurality of prioritized resource combinations is no longer in use by but is still being occupied by the video player instance;
    the resource manager determining a priority of the another video player instance and determining that the previously assigned one of the plurality of prioritized resource combinations is appropriate based on the priority of the another video player instance; and
    reassigning the same one of the plurality of prioritized resource combinations to the another video player instance.

4. The method of claim 3, further comprising:
    requesting to resume display of the video content associated with the video player instance;
    determining that the one of the plurality of prioritized resource combinations has been reassigned;
    the resource manager re-determining the priority of the video player instance; and
    assigning another one of the plurality of prioritized resource combinations to the video player instance based on the re-determined priority, wherein the another one of the plurality of prioritized resource combinations comprises another determined one of the plurality of decoder resources and another determined one of the plurality of rendering resources.

5. The method of claim 1, wherein the plurality of decoding resources includes one or more hardware decoders and a decoding module executed on a central processing unit (CPU).

6. The method of claim 1, wherein the plurality of rendering resources includes an overlay engine, a graphics processing unit (GPU), and a rendering module executed on a central processing unit (CPU).

7. The method of claim 1, wherein the resource manager is configured to determine the priority of the video player instance based on a video object criterion, wherein the video object criterion includes at least one of: video profile information, metadata, size, location, resolution, or activity status.

8. The method of claim 1, wherein the resource manager is configured to determine the priority of the video player instance based on a video complexity.

9. The method of claim 1, wherein said assigning includes determining an appropriate one of the plurality of prioritized resource combinations for the video player instance based on the determined priority and based on which of the plurality of decoding resources and which of the plurality of rendering resources are not actively being used.

10. A non-transitory computer-readable storage medium storing program instructions, wherein the program instructions are computer-executable to implement:
    associating a priority, by a resource manager, to each one of a plurality of resource combinations, each one of the plurality of resource combinations comprising a determined one of a plurality of decoding resources and a determined one of a plurality of rendering resources;
    requesting to display video content associated with a video player instance;
    the resource manager determining a priority of the video player instance; and
    assigning one of the plurality of prioritized resource combinations to the prioritized video player instance.

11. The non-transitory computer-readable storage medium of claim 10, wherein the program instructions are further computer-executable to implement:
    requesting to display video content associated with another video player instance;
    the resource manager determining a priority of the another video player instance; and
    assigning another one of the plurality of prioritized resource combinations to the another video player instance based on the determined priority of the another video player instance, wherein the another one of the plurality of prioritized resource combinations comprises another determined one of the plurality of decoder resources and another determined one of the plurality of rendering resources.

12. The non-transitory computer-readable storage medium of claim 10, wherein the program instructions are further computer-executable to implement:
    requesting to display video content associated with another video player instance;
    detecting that the previously assigned one of the plurality of prioritized resource combinations is no longer in use by but is still being occupied by the video player instance;
    the resource manager determining a priority of the another video player instance and determining that the previously assigned one of the plurality of prioritized resource combinations is appropriate based on the priority of the another video player instance; and reassigning the same one of the plurality of prioritized resource combinations to the another video player instance.

13. The non-transitory computer-readable storage medium of claim 12, wherein the program instructions are further computer-executable to implement:

requesting to resume display of the video content associated with the video player instance;

determining that the one of the plurality of prioritized resource combinations has been reassigned;

the resource manager re-determining the priority of the video player instance; and assigning another one of the plurality of prioritized resource combinations to the video player instance based on the re-determined priority, wherein the another one of the plurality of prioritized resource combinations comprises another determined one of the plurality of decoder resources and another determined one of the plurality of rendering resources.

14. The non-transitory computer-readable storage medium of claim 10, wherein the program instructions are further computer-executable to implement a decoding module, and wherein the plurality of decoding resources includes one or more hardware decoders and the decoder module.

15. The non-transitory computer-readable storage medium of claim 10, wherein the program instructions are further computer-executable to implement a rendering module, and wherein the plurality of rendering resources includes an overlay engine, a graphics processing unit (GPU), and the rendering module.

16. The non-transitory computer-readable storage medium of claim 10, wherein the resource manager is configured to determine the priority of the video player instance based on a video object criterion.

17. A system, comprising:
at least one processor; and
a memory comprising program instructions, wherein the program instructions are executable by the at least one processor to implement:

associating a priority, by a resource manager, to each one of a plurality of resource combinations, each one of the plurality of resource combinations comprising a determined one of a plurality of decoding resources and a determined one of a plurality of rendering resources;

requesting to display video content associated with a video player instance;

the resource manager determining a priority of the video player instance; and assigning the prioritized video player instance to one of the plurality of prioritized resource combinations.

18. The system of claim 17, wherein the program instructions are further executable by the at least one processor to implement:

requesting to display video content associated with another video player instance;

the resource manager determining a priority of the another video player instance; and assigning another one of the plurality of prioritized resource combinations to the another video player instance based on the determined priority of the another video player instance, wherein the another one of the plurality of prioritized resource combinations comprises another determined one of the plurality of decoder resources and another determined one of the plurality of rendering resources.

19. The system of claim 17, wherein the program instructions are further executable by the at least one processor to implement:

requesting to display video content associated with another video player instance;

detecting that the previously assigned one of the plurality of prioritized resource combinations is no longer in use by but is still being occupied by the video player instance;

the resource manager determining a priority of the another video player instance and determining that the previously assigned one of the plurality of prioritized resource combinations is appropriate based on the priority of the another video player instance; and reassigning the same one of the plurality of prioritized resource combinations to the another video player instance.

20. The system of claim 19, wherein the program instructions are further executable by the at least one processor to implement:

requesting to resume display of the video content associated with the video player instance;

determining that the one of the plurality of prioritized resource combinations has been reassigned;

the resource manager re-determining the priority of the video player instance; and assigning another one of the plurality of prioritized resource combinations to the video player instance based on the re-determined priority, wherein the another one of the plurality of prioritized resource combinations comprises another determined one of the plurality of decoder resources and another determined one of the plurality of rendering resources.

* * * * *